United States Patent
Matsumoto et al.

(10) Patent No.: US 11,787,910 B2
(45) Date of Patent: Oct. 17, 2023

(54) NON-AQUEOUS DISPERSION

(71) Applicant: DAIKIN INDUSTRIES, LTD., Osaka (JP)

(72) Inventors: Haruna Matsumoto, Osaka (JP); Shinji Murakami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 335 days.

(21) Appl. No.: 16/971,961

(22) PCT Filed: Feb. 7, 2019

(86) PCT No.: PCT/JP2019/004352
§ 371 (c)(1),
(2) Date: Aug. 21, 2020

(87) PCT Pub. No.: WO2019/163525
PCT Pub. Date: Aug. 29, 2019

(65) Prior Publication Data
US 2020/0399432 A1 Dec. 24, 2020

(30) Foreign Application Priority Data
Feb. 23, 2018 (JP) .................. 2018-031002

(51) Int. Cl.
*C08J 3/11* (2006.01)
*C09D 127/18* (2006.01)

(52) U.S. Cl.
CPC ............ *C08J 3/11* (2013.01); *C09D 127/18* (2013.01); *C08J 2327/18* (2013.01); *C08J 2327/20* (2013.01)

(58) Field of Classification Search
None
See application file for complete search history.

(56) References Cited

U.S. PATENT DOCUMENTS

| | | |
|---|---|---|
| 3,631,140 A | 12/1971 | Fang |
| 2006/0121385 A1 | 6/2006 | Uemura et al. |
| 2008/0081182 A1 | 4/2008 | Nam et al. |
| 2009/0297751 A1 | 12/2009 | Nam et al. |
| 2010/0081747 A1 | 4/2010 | Nam et al. |
| 2010/0204345 A1 | 8/2010 | Yamanaka et al. |
| 2010/0261809 A1 | 10/2010 | Nam et al. |
| 2011/0171403 A1 | 7/2011 | Tabata et al. |
| 2011/0272173 A1 | 11/2011 | Shiotsuki et al. |

FOREIGN PATENT DOCUMENTS

| | | | |
|---|---|---|---|
| GB | 2 205 576 A | 12/1988 | |
| JP | 63-286435 A | 11/1998 | |
| JP | 2003-340902 A | 12/2003 | |
| JP | 2007-119769 A | 5/2007 | |
| JP | 2008-88306 A | 4/2008 | |
| JP | 2008-239882 A | 10/2008 | |
| JP | 2009-1767 A | 1/2009 | |
| JP | 2009-078562 A | 4/2009 | |
| JP | 2010-539252 A | 12/2010 | |
| JP | 2011-8298 A | 1/2011 | |
| JP | 5488560 B2 * | 5/2014 | ............ C08J 3/005 |
| JP | 2015-78374 A | 4/2015 | |
| JP | 2017-066327 A | 4/2017 | |
| JP | 2017-088861 A | 5/2017 | |
| TW | 544024 B * | 8/2016 | |
| WO | WO-9717381 A1 * | 5/1997 | ............ C08F 14/18 |
| WO | 2009/020187 A1 | 2/2009 | |
| WO | 2012/029929 A1 | 3/2012 | |
| WO | WO-2018212351 A1 * | 11/2018 | ......... B29C 48/0013 |

OTHER PUBLICATIONS

Machine translation of JP 5488560 B2, retrieved Sep. 2022 (Year: 2022).*
Machine Translation of TW I544024 B, retrieved Jun. 2023 (Year: 2023).*
International Preliminary Report on Patentability with a translation of the Written Opinion for PCT Appln. No. PCT/JP2019/004352, dated Aug. 27, 2020.
International Search Report for PCT/JP2019/004352, dated Apr. 23, 2019.
Extended European Search Report dated Oct. 13, 2021 in counterpart European Application No. 19757590.5.

* cited by examiner

*Primary Examiner* — Nicole M. Buie-Hatcher
(74) *Attorney, Agent, or Firm* — Sughrue Mion, PLLC

(57) ABSTRACT

Provided is a highly stable non-aqueous dispersion even without surfactants. The present invention relates to a non-aqueous dispersion including a fluoropolymer and a non-aqueous solvent, the fluoropolymer in the non-aqueous dispersion having an average dispersed particle size of smaller than 1.0 μm, the fluoropolymer being present in an amount of 5 to 45% by mass, the non-aqueous solvent having a surface tension of 30 mN/m or lower, the non-aqueous dispersion containing a surfactant in an amount of less than 0.1% by mass relative to the fluoropolymer.

3 Claims, No Drawings

NON-AQUEOUS DISPERSION

CROSS REFERENCE TO RELATED APPLICATIONS

This application is a National Stage of International Application No. PCT/JP2019/004352 filed Feb. 7, 2019, claiming priority based on Japanese Patent Application No. 2018-031002 filed Feb. 23, 2018.

TECHNICAL FIELD

The disclosure relates to non-aqueous dispersions of fluoropolymers.

BACKGROUND ART

Fluoropolymers having non-stickiness, heat resistance, low friction, unique electrical characteristics, and antistatic characteristics can be used in a variety of applications.

For example, Patent Literature 1 discloses a non-aqueous dispersion of polytetrafluoroethylene micropowder that contains at least 5 to 60% by mass of polytetrafluoroethylene micropowder and 0.1 to 15% by mass of a compound having a specific structure relative to the mass of the polytetrafluoroethylene micropowder and that has a moisture content in the whole dispersion measured by a Karl Fischer method of 8000 ppm or less.

CITATION LIST

Patent Literature

Patent Literature 1: JP 2017-66327 A

SUMMARY OF INVENTION

Technical Problem

The disclosure aims to provide a highly stable non-aqueous dispersion even without surfactants.

Solution to Problem

The disclosure provides a non-aqueous dispersion including:
a fluoropolymer; and
a non-aqueous solvent,
the fluoropolymer in the non-aqueous dispersion having an average dispersed particle size of smaller than 1.0 µm,
the fluoropolymer being present in an amount of 5 to 45% by mass,
the non-aqueous solvent having a surface tension of 30 mN/m or lower,
the non-aqueous dispersion containing a surfactant in an amount of less than 0.1% by mass relative to the fluoropolymer.

Preferably, the non-aqueous dispersion of the disclosure has a percentage of separation of 50% or lower after standing for 24 hours.

Preferably, the fluoropolymer is a perfluoropolymer. Preferably, the fluoropolymer is also at least one selected from the group consisting of polytetrafluoroethylene, a tetrafluoroethylene/hexafluoropropylene copolymer, and a tetrafluoroethylene/perfluoro(alkyl vinyl ether) copolymer.

Preferably, the non-aqueous dispersion of the disclosure is a release agent, a thickener, or a lubricant.

Advantageous Effects of Invention

The disclosure can provide a highly stable non-aqueous dispersion even without surfactants.

DESCRIPTION OF EMBODIMENTS

In Patent Literature 1, a compound (surfactant) having a specific structure is introduced to a non-aqueous dispersion so as to provide a non-aqueous dispersion having high storage stability. However, in some applications, residual surfactants, if present, may cause deterioration of the characteristics. Thus, the amount of surfactants used is desirably reduced.

Conventionally, introduction of a surfactant in a dispersion containing a fluoropolymer is common technical knowledge of a person skilled in the art, and varying the type of surfactants has been examined as disclosed in Patent Literature 1. The inventors have made various studies and have reached an unexpected result that dispersing a fluoropolymer with a specific particle size in a specific non-aqueous solvent can provide a highly stable non-aqueous dispersion even without surfactants. Thus, the non-aqueous dispersion of the disclosure is successfully developed.

The following will describe embodiments of the disclosure.

The non-aqueous dispersion of the disclosure contains a fluoropolymer and a non-aqueous solvent.

The fluoropolymer in the non-aqueous dispersion has an average dispersed particle size of smaller than 1.0 µm. The average dispersed particle size is preferably 0.8 µm or smaller, more preferably 0.5 µm or smaller, still more preferably 0.3 µm or smaller, particularly preferably 0.2 µm or smaller. With the above average dispersed particle size, the non-aqueous dispersion of the disclosure is highly stable. The lower limit of the average dispersed particle size may be, but is not limited to, 0.01 µm, for example. To achieve high productivity, the lower limit of the average dispersed particle size is preferably 0.01 µm or greater, more preferably 0.05 µm or greater.

The average dispersed particle size is a value determined by dynamic light scattering. The average dispersed particle size may be specifically measured by the following method.
(Conditions for Measurement of Average Dispersed Particle Size)

The dispersion is diluted with the same non-aqueous solvent as that of the non-aqueous dispersion to have a fluoropolymer concentration of about 10%. To the dilution is added 20 parts by mass of BL-10 (Sekisui Chemical Co., Ltd.) relative to 100 parts by mass of the resin, and the contents are stirred. The resulting mixture is further diluted five times with water, and is analyzed by dynamic light scattering.

The fluoropolymer preferably has an average primary particle size of smaller than 1.0 µm. The average primary particle size is more preferably 0.8 µm or smaller, still more preferably 0.5 µm or smaller, further more preferably 0.3 µm or smaller, particularly preferably 0.2 µm or smaller. In the non-aqueous dispersion of the disclosure, agglomerated secondary particles are mechanically sheared so that the particles are dispersed. Too large an average primary particle size may cause a difficulty in achieving a sufficiently small dispersed particle size, possibly resulting in low stability of the non-aqueous dispersion. To achieve high stability, the average primary particle size is preferably small, and the lower limit thereof may be, but is not limited to, 0.01 μm, for example. To achieve high productivity, the lower limit is preferably 0.01 μm or greater, more preferably 0.05 μm or greater.

The average primary particle size can be calculated as follows: the non-aqueous dispersion is diluted with isopropanol (IPA) to have a fluoropolymer concentration of about 200 ppm, the dilution is sprayed onto a measurement cell, and the particle sizes of 20 particles are measured with an electron microscope and averaged to give the average primary particle size.

The non-aqueous dispersion of the disclosure contains the fluoropolymer in an amount of 5 to 45% by mass. The amount of the fluoropolymer is preferably 40% by mass or less. The amount of the fluoropolymer is preferably 5% by mass or more, more preferably 10% by mass or more.

The non-aqueous dispersion containing the fluoropolymer in an amount within the above range is highly stable even when it contains a surfactant in an amount of less than 0.1% by mass relative to the fluoropolymer.

The non-aqueous solvent has a surface tension of 30 mN/m or lower. The surface tension is preferably 28 mN/m or lower, more preferably 25 mN/m or lower. The lower limit of the surface tension may be, but is not limited to, 10 mN/m, for example. To achieve high versatility, the surface tension is preferably 10 mN/m or higher. The non-aqueous dispersion of the disclosure containing a non-aqueous solvent having a surface tension within the above range is highly stable even without surfactants.

The surface tension may be measured with a surface tensiometer, for example. Specifically, the surface tension may be measured with a surface tensiometer at 25° C. by the Wilhelmy method.

Examples of the non-aqueous solvent include alcohols, esters, ketones, ethers, and hydrocarbons (e.g., aliphatic hydrocarbons and aromatic hydrocarbons). These organic solvents may or may not be fluorinated.

Specific examples of the non-aqueous solvent include alcohols such as methanol, ethanol, isopropanol, butanol, and hexanol; alkanes such as pentane, hexane, heptane, and octane; perfluorohexane; ketones such as acetone, methyl ethyl ketone, diisobutyl ketone, and methyl isobutyl ketone; and esters such as ethyl acetate, butyl acetate, ethyl benzoate, and butyl benzoate.

The non-aqueous solvent preferably has a boiling point of 40° C. to 250° C. The lower limit of the boiling point is more preferably 50° C., and the upper limit thereof is more preferably 200° C. A non-aqueous solvent having too low a boiling point may vaporize during operation, which may make it difficult to suppress the variation of the composition, leading to a need for safety measures against inflammation of vapors. A non-aqueous solvent having too high a boiling point may cause concerns about a prolonged drying time and an influence of heat on the dispersion during drying.

To provide a highly stable and easy-to-handle non-aqueous dispersion, the non-aqueous solvent is preferably at least one selected from the group consisting of isopropanol, methyl ethyl ketone, diisobutyl ketone, and methyl isobutyl ketone.

These non-aqueous solvents may be used alone or two or more of these may be used as a solvent mixture.

Preferably, the non-aqueous solvent is one not dissolving the fluoropolymer.

The non-aqueous dispersion of the disclosure contains a surfactant in an amount of less than 0.1% by mass relative to the fluoropolymer. The amount of the surfactant is preferably 0.01% by mass or less, more preferably 0.001% by mass or less relative to the fluoropolymer. Particularly preferably, the non-aqueous dispersion is substantially free from a surfactant.

The phrase "substantially free from a surfactant" means, for example, the case where peaks other than those derived from fluoropolymers are not detected in NMR analysis of a solution portion prepared by vaporizing the solvent and adding the resulting solids to a heavy solvent or in IR analysis of the solids.

The amount of the surfactant may be measured by an appropriate method selected in accordance with the type and structure of the surfactant.

The "surfactant" as used herein refers to an organic compound containing a hydrophobic group and a hydrophilic group in a molecule. For example, any compound that forms a micelle may be regarded as a surfactant.

The fluoropolymer is preferably a perfluoropolymer.

Perfluoropolymers have lower wettability to a dispersion medium among fluoropolymers and are therefore difficult to provide a stable dispersion without surfactants. Yet, the non-aqueous dispersion of the disclosure is highly stable even when the fluoropolymer is a perfluoropolymer.

The "perfluoropolymer" as used herein means a polymer mainly containing a polymerized unit based on a perfluoromonomer, optionally containing a polymerized unit based on a monomer other than the perfluoromonomer. The polymerized unit based on a perfluoromonomer is preferably present in an amount of 90 mol % or more, more preferably 95 mol % or more relative to all the polymerized units, for example.

Also, the polymerized unit based on a perfluoromonomer is preferably present in an amount of 99.0% by mass or more.

The perfluoropolymer is preferably at least one selected from the group consisting of polytetrafluoroethylene (PTFE), a tetrafluoroethylene (TFE)/perfluoro(alkyl vinyl ether) (PAVE) copolymer (PFA), and a TFE/hexafluoropropylene (HFP) copolymer (FEP).

These perfluoropolymers may be used alone or two or more of these may be used in combination.

The PTFE may be low-molecular-weight melt-flowable PTFE or non melt-processible PTFE. Preferably, the PTFE is low-molecular-weight non-fibrillatable PTFE, which is not fiberized, because it can be easily dispersed in a solvent.

The low-molecular-weight PTFE preferably has a melt viscosity at 380° C. of $1 \times 10^2$ to $7 \times 10^5$ Pa·s. The "low-molecular-weight PTFE" as used herein means a PTFE having a melt viscosity within the above range, and any low-molecular-weight PTFE is non-fibrillatable.

The melt viscosity can be measured as follows. Specifically, a 2-g sample is heated at a measurement temperature (380° C.) for five minutes and the melt viscosity thereof is then measured at the same temperature and a load of 0.7 MPa using a flow tester and a 2φ-8 L die in conformity with ASTM D 1238.

The low-molecular-weight PTFE preferably has a melting point of 324° C. to 333° C. The melting point is the temperature corresponding to the maximum value on a heat-of-fusion curve drawn using a differential scanning calorimeter (DSC) at a temperature-increasing rate of 10° C./min.

The low-molecular-weight PTFE may be obtained by decomposition of high-molecular-weight PTFE resulting from application of electron beams or radiation. Still, it is preferably one obtained directly by polymerizing TFE. A chain transfer agent may be used in production of the low-molecular-weight PTFE by polymerization. Use of a chain transfer agent enables control of the molecular weight of the resulting low-molecular-weight PTFE.

The PTFE may be a tetrafluoroethylene (TFE) homopolymer or a copolymer of a TFE unit based on TFE and a modifying monomer unit based on a monomer other than TFE (hereinafter, also referred to as a "modifying monomer").

The modified PTFE preferably contains the modifying monomer unit in an amount of 0.001 to 1.0% by mass, more preferably 0.01 to 0.50% by mass, still more preferably 0.02 to 0.30% by mass, of all the monomer units.

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); a fluoroalkyl vinyl ether; a fluoroalkyl ethylene; ethylene; and a fluorine-containing vinyl ether containing a nitrile group. One or more of these modifying monomers may be used.

An example of the fluoroalkyl vinyl ether is, but not limited to, a fluoromonomer represented by the following formula (1):

$$CF_2=CF-ORf^1 \quad (1)$$

(wherein $Rf^1$ is a perfluoro organic group). The "perfluoro organic group" as used herein means an organic group in which hydrogen atoms binding to any carbon atom are all replaced by fluorine atoms. The perfluoro organic group optionally contains ether oxygen.

An example of the fluoroalkyl vinyl ether is a fluoromonomer represented by the formula (1) wherein $Rf^1$ is a C1-C10 perfluoroalkyl group. The perfluoroalkyl group preferably has a carbon number of 1 to 5.

Examples of the perfluoroalkyl group in the fluoroalkyl vinyl ether include perfluoromethyl, perfluoroethyl, perfluoropropyl, perfluorobutyl, perfluoropentyl, and perfluorohexyl groups. Preferred is perfluoro(propyl vinyl ether) (PPVE) in which the perfluoroalkyl group is a perfluoropropyl group.

Examples of the fluoroalkyl vinyl ether further include a fluoroalkyl vinyl ether represented by the formula (1) wherein $Rf^1$ is a C4-C9 perfluoro(alkoxy alkyl) group; a fluoroalkyl vinyl ether represented by the formula (1) wherein $Rf^1$ is a group represented by the following formula:

[Chem. 1]
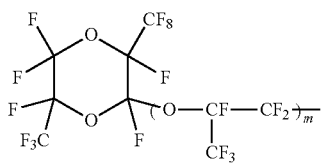

(wherein m is an integer of 0 or 1 to 4); and a fluoroalkyl vinyl ether represented by the formula (1) wherein $Rf^1$ is a group represented by the following formula:

[Chem. 2]
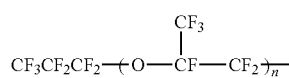

(wherein n is an integer of 1 to 4).

A preferred example of the fluoroalkyl ethylene is, but not limited to, a (perfluoroalkyl)ethylene. Examples thereof include (perfluorobutyl)ethylene (PFBE) and (perfluorohexyl)ethylene.

The PFA is a copolymer containing a TFE unit and a PAVE unit based on a perfluoro(alkyl vinyl ether).

The PAVE constituting the PFA may be, for example, at least one selected from the group consisting of a PAVE represented by the following formula (2):

$$CF_2=CFO(CF_2CFY^1O)_p-(CF_2CF_2CF_2O)_q-R^f \quad (2)$$

(wherein $Y^1$ is F or $CF_3$; $R^f$ is a C1-C5 perfluoroalkyl group; p is an integer of 0 to 5; and q is an integer of 0 to 5; and a PAVE represented by the following formula (3):

$$CFX=CXOCF_2OR^1 \quad (3)$$

(wherein Xs are the same as or different from each other and are each F or $CF_3$; and $R^1$ is a linear or branched C1-C6 perfluoroalkyl group or a C5 or C6 cyclic perfluoroalkyl group).

Specific examples thereof include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE).

The PAVE is preferably a PAVE having a bulky side chain, specifically preferably PPVE.

The PFA preferably contains the polymerized unit based on PAVE in an amount of 1.0 to 10% by mass relative to all the polymerized units.

The amount of the polymerized unit based on PAVE is more preferably 2.0% by mass or more, still more preferably 3.5% by mass or more, particularly preferably 4.0% by mass or more, while more preferably 8.0% by mass or less, still more preferably 7.0% by mass or less, particularly preferably 6.5% by mass or less, relative to all the polymerized units. The amount of the polymerized unit based on PAVE is determined by $^{19}F$-NMR.

The PFA preferably contains the polymerized unit based on TFE and the polymerized unit based on PAVE in a total amount of 90 mol % or more, more preferably 95 mol % or more, relative to all the polymerized units. The PFA also preferably consists only of a polymerized unit based on TFE and a polymerized unit based on PAVE.

The PFA may be free from a HFP unit.

The PFA preferably has a melting point of 280° C. to 322° C.

The melting point is more preferably 290° C. or higher, while more preferably 315° C. or lower.

The melting point is the temperature corresponding to the maximum value on a heat-of-fusion curve drawn using a differential scanning calorimeter (DSC) at a temperature-increasing rate of 10° C./min.

The FEP includes a TFE unit and a HFP unit based on hexafluoropropylene.

The FEP preferably gives a mass ratio between the TFE unit and the HFP unit (TFE/HFP) of (70 to 99)/(1 to 30) (% by mass), more preferably (80 to 97)/(3 to 20) (% by mass).

The FEP also preferably contains a PAVE unit in addition to the TFE unit and the HFP unit, in other words, the FEP is preferably a TFE/HFP/PAVE copolymer. Examples of the PAVE unit contained in the FEP include those described for the PAVE unit constituting PFA. In particular, PPVE is more preferred.

The FEP preferably contains the polymerized unit based on TFE, the polymerized unit based on HFP, and the polymerized unit based on PAVE in a total amount of 90 mol % or more, more preferably 95 mol % or more, relative to all the polymerized units. The FEP may consist only of a polymerized unit based on TFE and a polymerized unit based on HFP or of a polymerized unit based on TFE, a polymerized unit based on HFP, and a polymerized unit based on PAVE.

In the case of a TFE/HFP/PAVE copolymer, the FEP preferably has a mass ratio (TFE/HFP/PAVE) of (70 to 99.8)/(0.1 to 25)/(0.1 to 25) (% by mass). A mass ratio within the above range can lead to better heat resistance. The mass ratio (TFE/HFP/PAVE) is more preferably (75 to 98)/(1.0 to 15)/(1.0 to 10) (% by mass).

The TFE/HFP/PAVE copolymer contains the HFP unit and the PAVE unit in a total amount of 1% by mass or more.

The TFE/HFP/PAVE copolymer preferably contains the HFP unit in an amount of 25% by mass or less of all the monomer units. The HFP unit in an amount within the above range can lead to better heat resistance. The amount of the HFP unit is more preferably 20% by mass or less, still more preferably 18% by mass or less, particularly preferably 15% by mass or less, while preferably 0.1% by mass or more, more preferably 1% by mass or more, particularly preferably 2% by mass or more.

The amount of the HFP unit can be determined by $^{19}$F-NMR.

The TFE/HFP/PAVE copolymer contains the PAVE unit in an amount of more preferably 20% by mass or less, still more preferably 10% by mass or less, particularly preferably 3% by mass or less, while preferably 0.1% by mass or more, more preferably 1% by mass or more. The amount of the PAVE unit can be determined by $^{19}$F-NMR.

The FEP may further contain an ethylenic monomer (a) unit.

The ethylenic monomer (a) unit may be any monomer unit copolymerizable with a TFE unit and a HFP unit, and further a PAVE unit in the case of a TFE/HFP/PAVE copolymer. Examples thereof include fluorine-containing ethylenic monomers such as vinyl fluoride (VF), vinylidene fluoride (VdF), and chlorotrifluoroethylene (CTFE) and non-fluorinated ethylenic monomers such as ethylene, propylene, and alkyl vinyl ethers.

In the case of a TFE/HFP/PAVE/ethylenic monomer (a) copolymer, the copolymer preferably has a mass ratio (TFE/HFP/PAVE/ethylenic monomer (a)) of (70 to 98)/(0.1 to 25)/(0.1 to 25)/(0.1 to 10) (% by mass), more preferably (70 to 98)/(0.1 to 25)/(0.1 to 20)/(0.1 to 5) (% by mass), still more preferably (70 to 98)/(0.1 to 20)/(0.1 to 10)/(0.1 to 3) (% by mass).

The TFE/HFP copolymer contains the polymerized unit(s) other than the TFE unit in a total amount of 1% by mass or more.

The FEP preferably has a melting point of 150° C. to 320° C. The melting point is more preferably 300° C. or lower, still more preferably 280° C. or lower.

The melting point is the temperature corresponding to the maximum value on a heat-of-fusion curve drawn using a differential scanning calorimeter (DSC) at a temperature-increasing rate of 10° C./min.

The PFA and FEP each preferably have a melt flow rate (MFR) of 0.1 to 100 g/10 min, more preferably 0.1 to 80 g/10 min, still more preferably 1 to 60 g/10 min, particularly preferably 1 to 50 g/10 min.

The MFR is the mass (g/10 min) of the polymer flowed out of a nozzle having an inner diameter of 2 mm and a length of 8 mm per 10 minutes at 372° C. and a load of 5 kg in conformity with ASTM D 1238.

The PFA and FEP each preferably have an initial pyrolysis temperature (1% mass reduction temperature) of 360° C. or higher. The lower limit is more preferably 370° C. The upper limit of the initial pyrolysis temperature may be 410° C., for example, as long as it falls within the above range.

The initial pyrolysis temperature refers to the temperature at which 1% by mass of the copolymer under a heating test is decomposed. It is obtained by determining the temperature at which 1% by mass of the mass of the copolymer under a heating test is reduced using a thermogravimetric-differential thermal analyzer (TG-DTA).

The fluoropolymer can be produced by appropriately mixing monomers that are to provide the structural units thereof and an additive such as a polymerization initiator and emulsion polymerizing the mixture.

The non-aqueous dispersion of the disclosure preferably has a percentage of separation of 50% or lower after standing for 24 hours. The percentage of separation is more preferably 40% or lower.

The dispersion is put into a flat-bottom cylindrical vessel, shaken for five minutes, and allowed to stand at room temperature for 24 hours. The thickness of the resulting transparent supernatant is measured with a ruler. The proportion of the supernatant is calculated as the percentage of separation using the following equation:

(percentage of separation (%))=(thickness of supernatant (cm))/(height from bottom to the whole liquid surface (cm))×100.

The non-aqueous dispersion of the disclosure may contain a different additive in addition to the non-aqueous solvent and the fluoropolymer as long as the effects achieved by the non-aqueous dispersion of the disclosure are not impaired.

The different additive may be appropriately selected depending on the purpose of its uses, and examples thereof include leveling agents, wood flour, quartz sand, carbon black, diamond, tourmaline, germanium, alumina, silicon nitride, fluorite, clay, talc, extender pigments, various bulking materials, conductive fillers, bright materials, pigments, fillers, dispersants for pigments, precipitation inhibitors, moisture absorbents, surface conditioners, thixotropy imparting agents, viscosity modifiers, antigelling agents, ultraviolet absorbers, light stabilizers, plasticizers, anti-flooding agents, anti-skinning agents, scratch inhibitors, fungicides, antibacterial agents, antioxidants, antistatic agents, silane coupling agents, antifoaming agents, drying agents, and cissing inhibitors.

The non-aqueous dispersion of the disclosure can be prepared, for example, by adding a fluoropolymer powder (secondary particles) to a non-aqueous solvent and disintegrating it.

For example, preparation by disintegration may be achieved by sonication on a non-aqueous solvent containing a fluoropolymer powder, by bead milling dispersion with glass beads added thereto, or using a homogenizer.

Preferred among these is bead milling dispersion in order to provide a non-aqueous fluoropolymer dispersion having an average dispersed particle size of smaller than 1.0 μm.

When the fluoropolymer is low-molecular-weight PTFE, the powder thereof preferably has a specific surface area of 5 m$^2$/g or larger, more preferably 8 m$^2$/g or larger. The specific surface area may have an upper limit of 100 m$^2$/g as long as it falls within the above range.

The specific surface area is measured using a surface analyzer (trade name: MONOSORB, available from Quantachrome Instruments) by the BET method with a gas mixture of 30% nitrogen and 70% helium as the carrier gas and liquid nitrogen as the coolant.

The fluoropolymer powder preferably has an average particle size (D50) of 100 μm or smaller, more preferably 50 μm or smaller.

The average particle size is a value of D50 determined by laser diffraction using a dry laser diffraction particle size distribution analyzer at a dispersion pressure of 3 bar.

The non-aqueous dispersion of the disclosure is highly stable even without surfactants, and thus can be used for various applications. In particular, the non-aqueous dispersion is suitable as a release agent, a thickener such as oil, or a lubricant.

Particularly preferably, the non-aqueous dispersion of the disclosure is suitable as a lubricant. A lubricant is applied to a surface of a target material to improve the lubricity. In some applications, residual surfactants, if present, may cause deterioration of the properties of a lubricant. Thus, the amount of residual surfactants in a lubricant is preferably as small as possible. The non-aqueous dispersion of the disclosure contains no or only a trace of a surfactant, and thus it can leave a reduced amount of a surfactant on the surface of the target material. The non-aqueous dispersion of the disclosure is particularly useful in the field of semiconductor manufacturing, which is susceptible to residual surfactants.

The non-aqueous dispersion of the disclosure is also suitable as a release agent. A release agent is used such that it is applied to an inner surface of a forming mold and then dried to remove the solvent. In order to reduce deposition of surfactants on a molded product formed using the forming mold, the amount of residual surfactants in a release agent is preferably as small as possible. The non-aqueous dispersion of the disclosure contains no or only a trace of a surfactant, and thus it can reduce deposition of a surfactant on a molded product formed using the forming mold. The non-aqueous dispersion of the disclosure is particularly useful in the field of semiconductor manufacturing, which is susceptible to residual surfactants.

EXAMPLES

The non-aqueous dispersion of the disclosure is described hereinbelow with reference to examples. Still, the non-aqueous dispersion of the disclosure is not intended to be limited by these examples.

The parameters in the examples and the comparative examples were determined by the following methods.

(Average Particle Size (D50))

D50 was determined by laser diffraction using a dry laser diffraction particle size distribution analyzer (MATSUBO Corporation) at a dispersion pressure of 3 bar.

(Average Primary Particle Size)

Material fluoropolymer powders used in the examples and the comparative examples were each dispersed in IPA, and the resulting dispersion was diluted to about 200 ppm. The dilution was sprayed onto a measurement cell and dried to remove IPA. The measurement cell was subjected to TEM measurement with an electron microscope (Thermo Fisher Scientific K.K.).

(Average Dispersed Particle Size)

The non-aqueous dispersions prepared in the examples and the comparative examples were each diluted with the same non-aqueous solvent as that of the non-aqueous dispersion to have a fluoropolymer concentration of about 10%. To the dilution was added 20 parts by mass of BL-10 (Sekisui Chemical Co., Ltd.) relative to 100 parts by mass of the resin, and the contents were stirred. The resulting mixture was further diluted five times with water, and was analyzed by dynamic light scattering with Microtrac (Nikkiso Co., Ltd.).

(Percentage of Separation)

The non-aqueous dispersions prepared in the examples and the comparative examples were each put into a flat-bottom cylindrical vessel, shaken for five minutes, and allowed to stand at room temperature for 24 hours. The thickness of the resulting transparent supernatant was measured with a ruler. The proportion of the supernatant was calculated as the percentage of separation using the following equation:

(percentage of separation (%))=(thickness of supernatant (cm))/(height from bottom to the whole liquid surface (cm))×100.

(Dispersion)

Bead milling treatment was performed with a three-roll sand grinder (Aimex Co., Ltd.).

Example 1

A fluoropolymer dispersion was prepared by processing 20% by mass of a TFE/HFP copolymer (FEP 1) powder having an average particle size (D50) of 2.5 µm, an average primary particle size of 70 nm, and a melting point of 225° C. as a fluoropolymer and 80% by weight of isopropyl alcohol (IPA) having a surface tension of 20 mN/m (25° C.) as a non-aqueous solvent using a bead mill (Aimex Co., Ltd.) with 460 g of 2-mm diameter glass beads at 1000 rpm for 30 minutes. The resulting dispersion was filtered through a 120-mesh stainless steel wire mesh to be separated from the glass beads.

Example 2

A dispersion was prepared as in Example 1, except that POLYFLON PTFE Luberon L-5 (Daikin Industries, Ltd.), which is a polytetrafluoroethylene (PTFE) powder having an average particle size (D50) of 5 µm and an average primary particle size of 140 nm, was used as a fluoropolymer.

Example 3

A dispersion was prepared as in Example 1, except that methyl ethyl ketone (MEK) having a surface tension of 25 mN/m (20° C.) was used as a non-aqueous solvent.

Example 4

A dispersion was prepared as in Example 1, except that the solid content was set to 10%.

Example 5

A dispersion was prepared as in Example 1, except that the solid content was set to 40%.

Comparative Example 1

A dispersion was prepared as in Example 1, except that a FEP (FEP 2) powder having an average particle size (D50) of 50 µm, an average primary particle size of 4 µm (4000 nm), and a melting point of 258° C. was used as a fluoropolymer.

The dispersion prepared in Comparative Example 1 had poor dispersion stability, and could not be analyzed by dynamic light scattering. Therefore, the "Average dispersed particle size" column in Table 1 was filled with the primary particle size measured by the above-described electron microscope (Thermo Fisher Scientific K.K.).

Comparative Example 2

A dispersion was prepared as in Example 1, except that N-methylpyrrolidone (NMP) was used as a non-aqueous solvent.

A solvent having a high surface tension like the solvent used in Comparative Example 2 was not miscible with a fluoropolymer powder, and the fluoropolymer powder floated in the solvent. Such a fluoropolymer powder itself was not ground by a bead mill, and thus had a greater dispersed particle size.

Comparative Example 3

Although the same procedure as in Example 1 was performed, except that the solid content was set to 50%, no dispersion was prepared due to too small a proportion of the solvent.

TABLE 1

|  | Fluoropolymer | Average primary particle size (D50) of fluoropolymer nm | Solid content % | Non-aqueous solvent | Surface tension of solvent mN/m | Amount of surfactant relative to fluoropolymer wt % | Percentage of separation % | Average dispersed particle size (D50) nm |
|---|---|---|---|---|---|---|---|---|
| Example 1 | FEP 1 | 70 | 20 | IPA | 20 (25° C.) | 0 | 9 | 155 |
| Example 2 | PTFE | 140 | 20 | IPA | 20 (25° C.) | 0 | 8 | 142 |
| Example 3 | FEP 1 | 70 | 20 | MEK | 25 (20° C.) | 0 | 18 | 178 |
| Example 4 | FEP 1 | 70 | 10 | IPA | 20 (25° C.) | 0 | 33 | 280 |
| Example 5 | FEP 1 | 70 | 40 | IPA | 20 (25° C.) | 0 | 0 | 327 |
| Comparative Example 1 | FEP 2 | 4000 | 20 | IPA | 20 (25° C.) | 0 | 56 | 4000 |
| Comparative Example 2 | FEP 1 | 70 | 20 | NMP | 41 (25° C.) | 0 | 100 | 4961 |
| Comparative Example 3 | FEP 1 | 70 | 50 | IPA | 20 (25° C.) | 0 | — | — |

The invention claimed is:

1. A non-aqueous dispersion comprising:
a fluoropolymer; and
a non-aqueous solvent,
wherein the non-aqueous dispersion is prepared by adding a fluoropolymer powder in a form of secondary particles to a non-aqueous solvent and disintegrating the fluoropolymer powder,
the fluoropolymer in the non-aqueous dispersion having an average dispersed particle size of smaller than 1.0 μm after the disintegration,
the fluoropolymer being present in an amount of 5 to 45% by mass,
the non-aqueous solvent having a surface tension of 30 mN/m or lower,
the non-aqueous dispersion containing a surfactant in an amount of less than 0.1% by mass relative to the fluoropolymer,
wherein the fluoropolymer is a perfluoropolymer,
wherein the perfluoropolymer is at least one selected from the group consisting of polytetrafluoroethylene (PTFE), a tetrafluoroethylene (TFE)/perfluoro(alkyl vinyl ether) (PAVE) copolymer (PFA), and a TFE/hexafluoropropylene (HFP) copolymer (FEP),
wherein the PTFE has a melting point of 324° C. to 333° C.,
wherein the PFA has a melting point of 280° C. to 322° C.,
wherein the FEP has a melting point of 150° C. to 320° C.

2. The non-aqueous dispersion according to claim 1, wherein the non-aqueous dispersion has a percentage of separation of 50% or lower after standing for 24 hours.

3. The non-aqueous dispersion according to claim 1, wherein the non-aqueous dispersion is a release agent, a thickener, or a lubricant.

* * * * *